United States Patent
Imaida et al.

(10) Patent No.: US 12,437,122 B2
(45) Date of Patent: Oct. 7, 2025

(54) METHOD AND APPARATUS FOR PRODUCING RECORDING MEDIUM AND COMPUTER PROGRAM

(71) Applicants: MICWARE CO., LTD., Kobe (JP); ATP ELECTRONICS TAIWAN INC., Taipei (TW)

(72) Inventors: Kenta Imaida, Kobe (JP); Takuma Segawa, Kobe (JP); Eishin Hirokawa, Kobe (JP); Chien-Pao Lee, Kaohsiung (TW); Hsiu-Hui Huang, Kaohsiung (TW)

(73) Assignees: MICWARE CO., LTD., Kobe (JP); ATP ELECTRONICS TAIWAN INC., Taipei (TW)

( * ) Notice: Subject to any disclaimer, the term of this patent is extended or adjusted under 35 U.S.C. 154(b) by 14 days.

(21) Appl. No.: 18/371,759

(22) Filed: Sep. 22, 2023

(65) Prior Publication Data
US 2024/0012949 A1    Jan. 11, 2024

Related U.S. Application Data

(63) Continuation of application No. PCT/JP2022/013169, filed on Mar. 22, 2022.

(30) Foreign Application Priority Data

Mar. 22, 2021    (JP) .................... 2021-047471

(51) Int. Cl.
G06F 21/78    (2013.01)
G06F 21/10    (2013.01)
(Continued)

(52) U.S. Cl.
CPC .............. *G06F 21/78* (2013.01); *G06F 21/10* (2013.01); *G06F 21/554* (2013.01); *G06F 21/602* (2013.01)

(58) Field of Classification Search
None
See application file for complete search history.

(56) References Cited

U.S. PATENT DOCUMENTS 5,805,699 A    9/1998   Akiyama et al.
7,613,917 B1   11/2009  Chojnacki
(Continued)

FOREIGN PATENT DOCUMENTS

EP    1 148 488 A2   10/2001
EP    1 612 987 A1    1/2006
(Continued)

OTHER PUBLICATIONS

International Search Report (PCT/ISA/210), issued in PCT/JP2022/013169, dated Jun. 14, 2022.
(Continued)

*Primary Examiner* — Philip J Chea
*Assistant Examiner* — Bin Qing Zheng
(74) *Attorney, Agent, or Firm* — Birch, Stewart, Kolasch & Birch, LLP

(57) ABSTRACT

Provided is a method for producing a recording medium having a recording area in which content information indicating a content and security information for security for the content information are recorded. In the recording area, medium specifying information for uniquely identifying the recording medium itself is recorded in advance. The method includes steps of: (a) writing temporary security information including given information different from the medium specifying information, and the content information in the recording area; (b) reading the medium specifying information and the temporary security information from the recording area; (c) replacing the given information in the temporary security information with the medium specifying information; (d) encrypting the temporary security informa-
(Continued)

tion in which the given information is replaced with the medium specifying information to generate the security information; and (e) causing the security information generated in the step (d) to be recorded in the recording area.

18 Claims, 12 Drawing Sheets

(51) Int. Cl.
 *G06F 21/55* (2013.01)
 *G06F 21/60* (2013.01)

(56) References Cited

U.S. PATENT DOCUMENTS

| | | | |
|---|---|---|---|
| 2003/0142560 A1 | 7/2003 | Terao et al. | |
| 2004/0025041 A1 | 2/2004 | Kitamura et al. | |
| 2008/0235803 A1* | 9/2008 | Harada | G06F 21/57 |
| | | | 726/26 |
| 2009/0210724 A1* | 8/2009 | Hori | H04L 9/3271 |
| | | | 713/193 |
| 2012/0124390 A1* | 5/2012 | Zipperer | G06F 21/78 |
| | | | 711/E12.001 |
| 2012/0291134 A1* | 11/2012 | Masuda | G06F 21/10 |
| | | | 726/26 |
| 2014/0208007 A1 | 7/2014 | Cohen et al. | |
| 2016/0292400 A1* | 10/2016 | Thompson | G06F 21/105 |

FOREIGN PATENT DOCUMENTS

| | | | | |
|---|---|---|---|---|
| JP | 10-283270 A | 10/1998 | | |
| JP | 2003-196922 A | 7/2003 | | |
| JP | 2004-46452 A | 2/2004 | | |
| JP | 2004-145905 A | 5/2004 | | |
| JP | 2005-331579 A | 12/2005 | | |
| JP | 2011-169825 A | 9/2011 | | |
| JP | 2013178641 A | * 9/2013 | | G06K 17/00 |
| TW | 201443641 A | 11/2014 | | |

OTHER PUBLICATIONS

International Preliminary Report on Patentability and English translation of the Written Opinion of the International Searching Authority dated Oct. 5, 2023 for Application No. PCT/JP2022/013169.
Taiwanese Office Action and Search Report for Taiwanese Application No. 110129449, dated Apr. 3, 2024, with English translation.
Extended European Search Report for European Application No. 22775596.4, dated Aug. 2, 2024.

\* cited by examiner

METHOD AND APPARATUS FOR PRODUCING RECORDING MEDIUM AND COMPUTER PROGRAM

CROSS REFERENCE TO RELATED APPLICATIONS

This is a continuation application of International Application No. PCT/JP2022/013169, with an international filing date of Mar. 22, 2022, which claims priority of Japanese Patent Application No. 2021-047471 filed on Mar. 22, 2021, each of the content of which is incorporated herein by reference in its entirety.

BACKGROUND

Technical Field

The present invention relates to a method and an apparatus for producing a recording medium, and a computer program.

Related Art

Conventionally, security measures have been applied to map data used in a navigation system.

For example, JP 2005-331579 A discloses a map update system that can prohibit the unauthorized use of map data. In JP 2005-331579 A, a user records map data distributed from a distribution center in a recording medium and updates the map data of a navigation apparatus by connecting the recording medium to the navigation apparatus. In the recording medium used for updating the map data, a unique individual ID assigned to the navigation apparatus is recorded in advance. When the user sets the recording medium in a personal computer, the personal computer transmits the individual ID stored in the recording medium to the distribution center. The distribution center adds the individual ID as attribute data to the map data for update and distributes the map data for update. The map data for update is written in the recording medium set in the personal computer.

When the recording medium is removed from the personal computer and set in the navigation apparatus, the device determines whether the individual ID added to the map data on the recording medium matches the individual ID of the device. If they match each other, the map data on the recording medium is copied to the hard disk; otherwise, the copying is prohibited. This makes it possible to effectively prevent the unauthorized use of the map data for update.

According to the technique disclosed in JP 2005-331579 A, when the individual ID of a navigation apparatus whose map data is desired to be updated is read in advance, map data for update can be illegally used.

SUMMARY

An object of the present invention is to provide a technique for ensuring the proper use of a map or other contents duplicated to a recording medium.

A production method according to a first disclosure according to an exemplary embodiment of the present invention is a method for producing a recording medium having a recording area in which content information indicating a content and security information for the security of the content information are recorded. In the recording area, medium specifying information for uniquely identifying the recording medium itself is recorded in advance.

The method includes steps of (a) writing temporary security information and the content information in the recording area, the temporary security information including given information different from the medium specifying information, (b) reading the medium specifying information and the temporary security information from the recording area, (c) replacing the given information in the temporary security information with the medium specifying information, (d) encrypting the temporary security information in which the given information is replaced with the medium specifying information to generate the security information, and (e) causing the security information generated in the step (d) to be recorded in the recording area.

A production method according to a second disclosure further includes, in the first disclosure, the step (f) copying the temporary security information and the content information from a host recording medium in which original copies of the temporary security information and the content information are recorded to a recording medium different from the recording medium. In the method, the step (a) is performed after the step (f).

A production method according to a third disclosure further includes, in the second disclosure, a step (g) verifying whether the temporary security information written in the step (a) matches an original copy of the temporary security information and verifying whether the content information written in the step (a) matches the original copy.

According to a production method according to a fourth disclosure, in the third disclosure, an error is notified when at least one of the verification results in the step (g) indicates a mismatch.

According to a production method according to a fifth disclosure, in the fourth disclosure, when the error is notified, the step (g) is retried.

According to a production method according to a sixth disclosure, in the third disclosure, when both verification results in the step (g) indicate matches, the steps (b) to (e) are performed.

A production method according to a seventh disclosure further includes, in any one of the first to sixth disclosures, a step (h) reading the security information from the recording area of the recording medium and verifying whether or not the medium specifying information in the read security information matches the medium specifying information encrypted in the step (d). In the method, the step (h) is performed after the step (e).

A production method according to an eighth disclosure is the production method according to the seventh disclosure. When the verification result in step (h) indicates a mismatch, an error is notified.

A production method according to a ninth disclosure is the production method according to the eighth disclosure. When the error is notified, the step (h) is retried.

A production method according to a 10th disclosure is the production method according to any one of the first to ninth disclosures. The content information is map information indicating a map as the content.

A production method according to a 11th disclosure is the production method according to the 10th disclosure. The temporary security information written in the step (a) further includes vehicle specifying information for specifying a vehicle in which the map information is used and version information indicating the version of the map information. In the step (d), the vehicle specifying information and the version information are encrypted.

A production method according to a 12th disclosure is the production method according to the 11th disclosure. The temporary security information is encrypted in advance. The method further includes a step (i) decrypting the encrypted temporary security information. In the method, the step (i) is performed after the step (b), and the step (c) is performed after the step (i).

A production method according to a 13th disclosure is the production method according any one of the first to 12th disclosures. The recording medium is an SD memory card. The recording area includes a user area in which the user can rewrite data and a non-user area in which the user cannot rewrite data. The medium specifying information is recorded in advance in the non-user area. In the step (a), the temporary security information and the content information are written in the user area. In the step (b), a read command for reading the medium specifying information from the non-user area is transmitted to the recording medium, the medium specifying information transmitted from the recording medium in response to the read command is acquired to read the medium specifying information, and the temporary security information is read from the user area.

A production method according to a 14th disclosure, in any one of the first to 13th disclosures, further includes a step ( ) receiving a notification indicating that preparation of the recording medium as a recording target has been completed. The method performs the step (a) after receiving the notification.

A production method according to a 15th disclosure is the production method according to the 14th disclosure. The notification received in the step j) is a signal indicating that preparation of a plurality of the recording media is completed.

A production method according to a 16th disclosure is the production method according anyone of the fourth, fifth, eighth, and ninth disclosures. There are a plurality of the recording media. The error notification includes information specifying the recording medium, among the plurality of recording media, in which the verification result indicates a mismatch.

An apparatus according to a 17th disclosure according to an exemplary embodiment of the present invention includes a communications interface that communicates with an external device, a storage device, and an arithmetic circuit, and executes the production method according to any one of the first to 16th disclosures by using the arithmetic circuit. The storage device stores the content information and the temporary security information including the given information.

In response to reception of the signal, the arithmetic circuit reads the content information and the temporary security information from the storage device, transmits the content information and the temporary security information to a function inspection device via the communications interface, causes the function inspection device to execute the steps (a) and (b), receives the medium specifying information and the temporary security information from the function inspection device via the communications interface, executes the step (d), transmits the security information generated by executing the step (d) to the function inspection device via the communications interface, and causes the function inspection device to execute the step (e).

A computer program according to an 18th disclosure according to an exemplary embodiment of the present invention is configured to cause the arithmetic circuit of the apparatus according to the 17th disclosure to execute a process of reading the content information and the temporary security information from the storage device, a process of causing the function inspection device to transmit the content information and the temporary security information via the communications interface, a process of causing the function inspection device to transmit a command for executing the steps (a) and (b), a process of receiving the medium specifying information and the temporary security information from the function inspection device via the communications interface, a process of executing the step (d), a process of causing the function inspection device to transmit the security information generated by executing the step (d) via the communications interface, and a process of causing the function inspection device to transmit a command for executing the step (e).

Advantageous Effects of the Invention

According to an exemplary embodiment of the present invention, it is possible to provide a technique for ensuring the proper use of a map or other contents duplicated to a recording medium.

DETAILED DESCRIPTION

Figure 1:
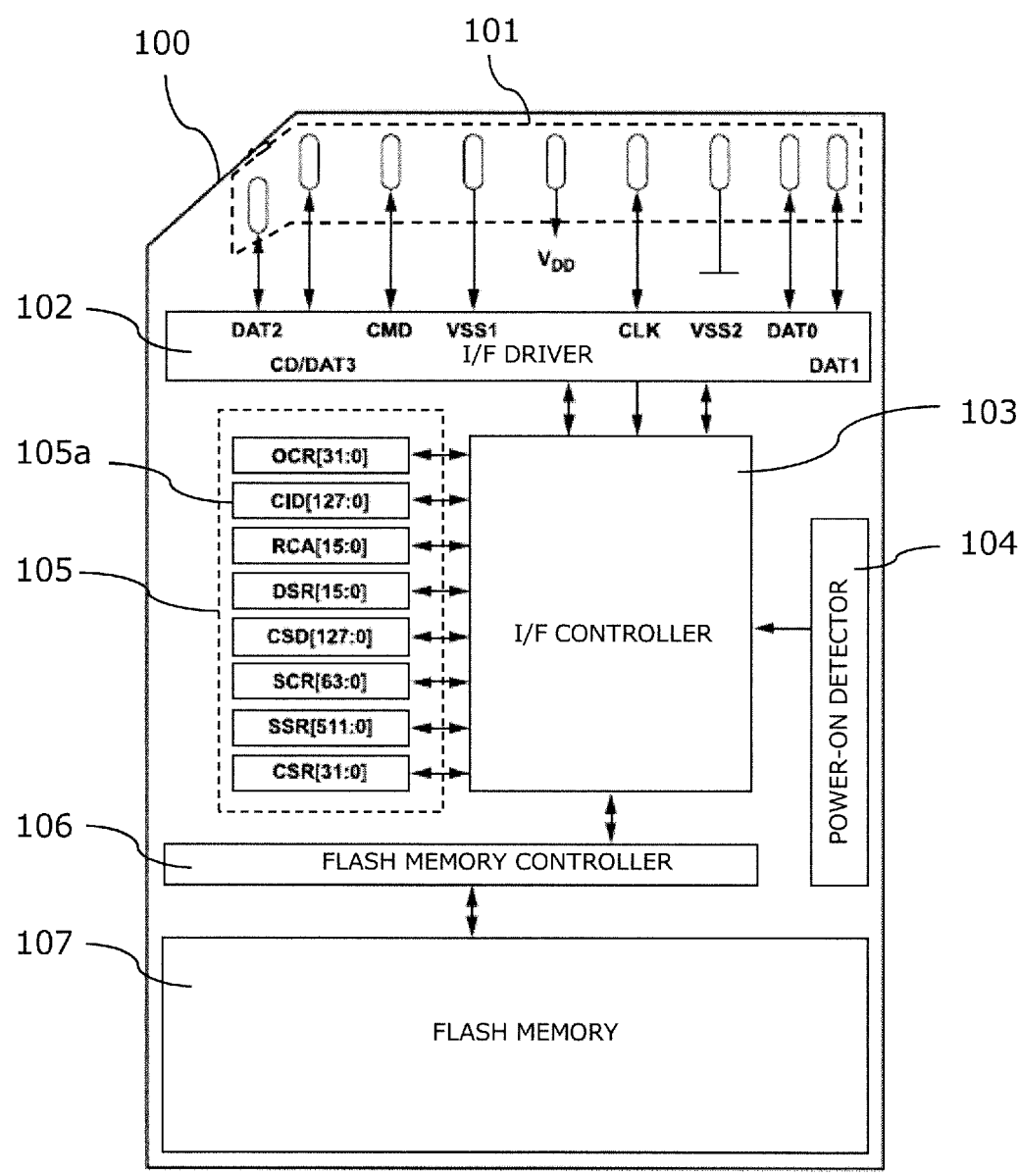
FIG. 1 is a diagram illustrating the structure of an SD memory card.

Embodiments will be described in detail below with reference to the accompanying drawings as appropriate. However, detailed descriptions more than necessary may be omitted. For example, detailed description of an already well-known matter and a duplicate description of substantially the same configuration may be omitted. This is to avoid unnecessary redundancy of the following description and to facilitate the understanding of those skilled in the art.

It should be noted that the present inventors provide the accompanying drawings and the following description in order to allow those skilled in the art to fully understand the present disclosure and does not intend to make them limit the subject matter described in the claims.

First, the background of completing the present invention by the present inventors will be described, and thereafter, a method and an apparatus and the like for producing a recording medium constituting the present invention will be described.

The present inventors have conducted development assuming an application of updating existing map information used by a car navigation apparatus using a secure digital (SD) memory card. The SD memory card stores map information for update in advance, and the user loads the SD memory card into the car navigation apparatus to update the existing map information. The present inventors have studied measures for making map information for update unusable even when the map information is duplicated by a person other than a map provider. Hereinafter, the measures will be specifically described.

Note that map information is not necessarily for update. Therefore, in the following description, information indicating a map will be described as "map information" regardless of whether it is for update. The map referred to herein may be, for example, a map of any country or region in the world, a map of a part of the country or region, or a map for updating only a region changed after a predetermined time. In addition, an SD memory card will be described below as an example, but the SD memory card is not essential, and any recording medium can be adopted.

[Configuration of SD Memory Card] The measure studied by the present inventors uses information uniquely assigned to each SD memory card and recorded in the SD memory card. Therefore, first, the structure of the SD memory card will be described with reference to FIG. 1. Hereinafter, the term "interface" is referred to as "I/F".

An SD memory card 100 includes a pin I/F 101, an I/F driver 102, an I/F controller 103, a power-on detector 104, a register group 105, a flash memory controller 106, and a flash memory 107.

The pin I/F 101 includes 9 pins. The nine pins include, for example, a data input/output pin, a card detection pin, a ground pin, a power supply pin, and a clock signal pin. In order to avoid direct contact of the user's finger with the pins, each of the nine pins is partitioned by a guard (not shown).

The I/F driver 102 receives a command or an instruction and data from the host device in which SD memory card 100 is used and converts the command or the instruction and the data into an appropriate data format. The host device is a device loaded with the SD memory card 100, for example, a car navigation apparatus or a PC. The I/F driver 102 reads data in the flash memory 107 and information in a register, converts the data into an appropriate data format, and transmits the data to the host device via the pin group 101. Note that data is transmitted and received between the SD memory card 100 and the host device in synchronization with a clock signal supplied from the host device.

The I/F controller 103 is connected to various elements constituting the SD memory card 100. The I/F controller 103 is connected to, for example, the I/F driver 102 and gives a command to the I/F driver 102 so that the I/F driver 102 performs the above-described operation. The I/F controller 103 is also connected to the register group 105, the power-on detector 104, and the flash memory controller 106, and can communicate with each of them.

The power-on detector 104 determines whether the SD memory card 100 is connected to the host device and the power is turned on upon being attached to the host device.

The register group 105 includes a plurality of registers. For example, the register group 105 includes a card identification (CID) register 105 a. Information that can uniquely identify any SD memory card is stored in advance in the CID register 105a. Such information is referred to as "CID" or "medium specifying information" in the present specification. Note that "in advance" means at a point of time when the manufacturer of the SD memory card 100 completes the manufacturing. In relation to the present embodiment, the CID is already stored in the SD memory card 100 at the time when the map information is recorded in the SD memory card 100 by the map vendor who is the sales supplier of the map information. Hereinafter, the manufacturer of the SD memory card 100 will be simply referred to as the "manufacturer".

The CID is a set of various pieces of information. For example, the CID includes an identification (ID) for identifying the manufacturer of the SD memory card 100 and the information of the name, revision, serial number, and manufacturing date of the product. The CID is no longer changed after being written to each SD memory card 100 by the manufacturer and is only read out. The host device can read the CID by transmitting a special command to the SD memory card 100.

The flash memory controller 106 performs control to write data to the flash memory 107 and performs control to read data from the flash memory 107.

The flash memory 107 has, for example, a large-capacity recordable area of 128 GB (gigabyte) and stores content information. The "content" may be a map, music, or video. In a case where the SD memory card 100 is used in a car navigation apparatus, the content may include latest installation position data of ORBIS(™), and update data of an operation system (OS) that controls the operation of the car navigation apparatus or a system of an automobile. In this specification, such information indicating a content is described as "content information". Note that, in the present specification, map information will be described as an example for convenience of understanding.

Figure 2:
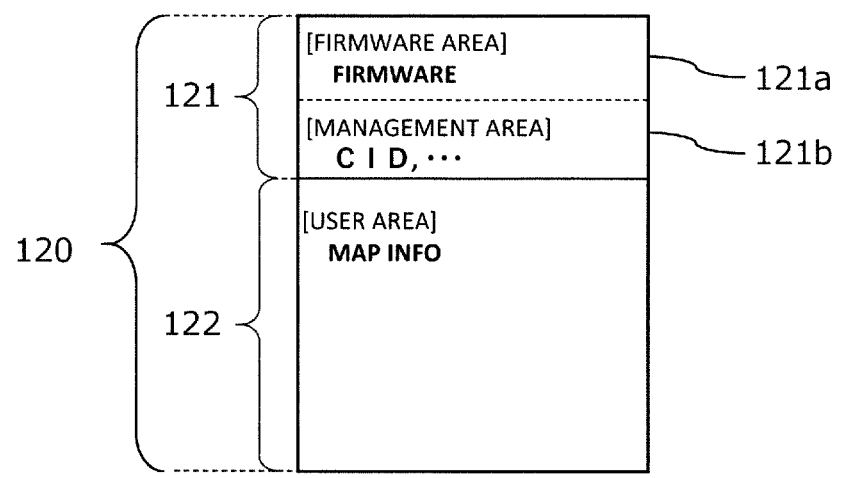
FIG. 2 is a diagram illustrating the recording area of the SD memory card.

A recording area 120 of the SD memory card 100 is illustrated in FIG. 2. The recording area 120 can be roughly divided into a non-user area 121 and a user area 122. Further, the non-user area 121 includes a firmware area 121a and a management area 121b.

Information unrewritable by the user is recorded in the non-user area 121, and information rewritable by the user is recorded in the user area 122. Unlike the illustrated aspect, in reality, the recording area 120 need not be provided as a continuous memory space. The recording area in which the non-rewritable information is recorded is merely conceptually referred to as the "non-user area 121", and the recording area in which the rewritable information is recorded is merely conceptually referred to as the "user area 122". After it is confirmed that the SD memory card 100 properly operates in the factory of the manufacturer, the recording area 120 illustrated in FIG. 2 is formed in the SD memory card 100.

Firmware is recorded in the firmware area 121a of the non-user area 121. The firmware is a program for operating the flash memory controller 106. Various management information is recorded in the management area 121b. The management information includes information recorded in various registers constituting the register group 105. That is, the various registers constitute the management area 121b. The CID described above is an example of the management information.

The user area 122 is an area secured in the flash memory 107. In the user area 122, map information and the like are recorded in a readable/writable manner.

The host device connected to the SD memory card 100 can read data in the user area 122 at any time but cannot normally access non-user area 121. Only the host device in which a command for reading the management information recorded in the management area 121b in the non-user area 121 is implemented can access the non-user area 121. For example, the manufacturer of the SD memory card 100 owns a PC which is a host device in which such a command is implemented.

Now, as an aspect of distributing the map information through a regular distribution route, it is considered that a map vendor sells the SD memory card 100 in which the map information is recorded. Since the map information is recorded in the user area 122 of the SD memory card 100, the map information can be technically easily copied to another SD memory card by using a PC or the like. It is necessary to prevent such copied map information from being illegally used. The present inventors have studied a method of associating map information with the SD memory card 100 in which the map information is recorded. The use of the map information read from the SD memory card 100 associated with each other is permitted, and the use of non-associated map information is restricted. A mechanism for guaranteeing such operation is required.

Therefore, the present inventors have introduced a mechanism of generating security information obtained by encrypting the CID and the like of each SD memory card 100 in which the map information is recorded and determining whether or not to permit the use of the map information using the security information. In the car navigation apparatus, a command to read the CID of the loaded recording medium is implemented, and it is determined whether the CID read using the command matches the CID encrypted in the map information. Then, the car navigation apparatus permits the use of the map information only when both the pieces of information coincide with each other.

Although the above measures seem to be easily implemented at a glance, there is actually a large problem. The problem is that the map vendor cannot read the CIDs of many SD memory cards to be distributed and hence cannot create security information by encrypting the CIDs and the like by itself.

In order to avoid the above problem, the present inventors adopted the following measures.

(1) A map vendor prepares a specific recording medium whose CID is known in advance. The map vendor generates security information including the CID. The security information includes at least the CID. The map vendor encrypts or does not encrypt such security information and provides the manufacturer with the map information as temporary security information. The reason for the term "temporary" is that it is assumed that the security information is rewritten according to the CID or the like of each recording medium as described below. Hereinafter, temporary security information is referred to as "temporary security information".

(2) The manufacturer reads the temporary security information. When the temporary security information is encrypted, the manufacturer decrypts the temporary security information using a procedure or decryption program prepared in advance.

(3) The manufacturer prepares a large number of blank SD memory cards 100. The manufacturer can read the CID of each SD memory card 100. The CID in the temporary security information provided from the map vendor is replaced with the CID of each SD memory card 100 in which the map information is to be recorded. Then, the temporary security information after the CID is replaced with the CID of the specific SD memory card 100 is encrypted. As a result, "security information" including the CID unique to the SD memory card 100 is generated. That is, at this point, it can be said that the "temporary security information" is converted into "security information" which is originally required. A command for reading the CID of the loaded recording medium is implemented in the car navigation apparatus, and it is determined whether the CID read using the command matches the CID in the encrypted security information. Then, the car navigation apparatus permits the use of the map information only when both the pieces of information coincide with each other.

The temporary security information may further include vehicle specifying information for specifying a vehicle in which the map information is used and version information indicating the version of the map information. Note that, in a situation where the SD memory card 100 is not sold, there may be a case where it is difficult to specify a vehicle in which the map information is actually used, that is, a case where it is difficult to determine the vehicle specifying information. In such a case, the vehicle specifying information common to all SD memory cards 100 may be allocated. Such common vehicle specifying information may be rewritten to vehicle specifying information that uniquely specifies the vehicle at a predetermined timing after the vehicle is used for the vehicle of each user after sale.

In the process (3), the manufacturer needs to encrypt the CID of each SD memory card 100. For a map vendor, since the encryption method is fundamental to security, it is desirable to avoid disclosing a specific encryption method to the outside of the company as much as possible. In addition, it is desirable to avoid disclosing the method for decrypting the encrypted CID to the outside of the company as much as possible. Therefore, the map vendor provides the manufacturer with software or a library for performing encryption without disclosing a specific specification. Since a specific encryption process performed by the library usually cannot be easily known, a map vendor can avoid specific disclosure of an encryption method to be held. In the process (2), even when decoding is necessary, software or a library for performing decoding may be similarly provided to the manufacturer.

On the other hand, the manufacturer can also avoid disclosing the CID itself of each SD memory card 100 or a command for reading the CID to the outside of the company. This makes it possible to encrypt the CIDs of the individual SD memory cards 100 while considering both businesses.

By introducing the above-described mechanism, even if the security information created in the process (2) is stolen and leaked to the outside, the unauthorized use of the map information recorded in another SD memory card 100 can be avoided. This is because even if the leaked security information is used, the CID in the security information does not match the CIDs of other SD memory cards, and the map information cannot be used by any SD memory card 100. In addition, a command for reading the CID and an encryption method for creating new security information using the CID are not generally available. Therefore, valid security information cannot be written in arbitrary SD memory card 100.

By the above method, it is possible to provide a mechanism for preventing the unauthorized use of the map information recorded and distributed in the SD memory card 100.

Hereinafter, exemplary embodiments of the present invention will be described.

1. [Embodiments]

Hereinafter, exemplary embodiments of the present disclosure will be described with reference to the accompanying drawings.

Configuration of Production System

First, the configuration of a production system 1 that produces a recording medium will be described with reference to FIG. 3.

The production system 1 includes a PC 2, a display 4, a function inspection device 6, and an indicator 8.

The PC 2 is a computer system that executes processing described in a flowchart to be described later. The specific configuration of the PC 2 will be described later with reference to FIG. 4. The PC 2 may be a computer in another form, for example, a workstation or a tablet terminal. A universal serial bus (USB) dongle 24 to be described later can be connected to the PC 2. In the present embodiment, an encryption program executed by the PC 2 is recorded in the USB dongle 24. The display 4 is connected to the PC 2 and displays video information output from the PC 2.

The function inspection device 6 is connected to the PC 2 and used to inspect the SD memory card 100 together with the PC 2. The function inspection device 6 includes a central board 10, a tester base 12, and an SD tester 14. The central board 10 and the SD tester 14 are disposed on the tester base 12.

The central board 10 of the function inspection device 6 is connected to the PC 2 and the indicator 8 and inspects the function of the SD memory card 100 loaded in the SD tester 14 according to a command from the PC 2. The central board 10 and the PC 2 are connected via, for example, a USB cable 18. The central board 10 and the indicator 8 are connected via, for example, an RJ-45 cable 20. Further, the indicator 8 and the PC 2 are connected via, for example, a USB cable 22.

The SD tester 8 of the function inspection device 6 is provided with a plurality of terminals. When the SD memory card 100 is loaded into the SD tester 14, each terminal of the SD tester 14 is communicably connected to each pin of the pin I/F 101 (FIG. 1).

An outline of the function inspection of the SD memory card 100 is as follows. First, when the SD memory card 100 is loaded, the central board 10 of the function inspection device 6 transmits a notification indicating that the preparation of the recording medium is completed to the PC 2 automatically upon detecting the loading or by a user operation. The PC 2 having received the notification transmits a write command or a read command to the central board 10. In response to the content of the command, the central board 10 writes information to the SD memory card 100 or reads information written to the SD memory card 100 via each terminal of the SD tester 14 and each pin of the SD memory card 100. The central board 10 sends the read information to the PC 2. The PC 2 verifies whether or not the information received from the SD tester 8 matches the information instructed to be written. When the verification result indicates a match, the recording of the information in the SD memory card 100 and the reading of the information from the SD memory card 100 are correctly performed. In contrast to this, when the verification result indicates a mismatch, at least one of recording and reading of information in SD memory card 100 is not correctly performed. Such a verification operation is referred to as operation verification of the SD memory card 100.

In the present embodiment, the SD tester 14 has an arrangement frame (not illustrated) for loading a plurality of SD memory cards 100. For example, a total of 32 SD memory cards 100 of 4 rows×8 columns are loaded in the arrangement frame of the SD tester 14, and the above-described operation verification can be independently performed for each SD memory card 100. As a result of the operation verification of each SD memory card 100, when there is the SD memory card 100 whose verification result indicates a mismatch, the PC 2 or the function inspection device 6 notifies an error using the indicator 8.

The indicator 8 is a board-like device having a plurality of point light sources 16. Each point light source 16 is, for example, a light emitting diode (LED) or an incandescent light bulb. As illustrated in FIG. 3, the plurality of point light sources 16 are arranged in the same numbers of rows and columns as the numbers of rows and columns of the arrangement frame of the SD tester 14. The indicator 8 notifies the user of the production system 1 of an error by turning on the point light source 16 at a position corresponding to the position of the SD memory card 100 whose verification result described above indicates a mismatch. For example, when the verification result of the SD memory card 100 loaded in the second row and the third column of the arrangement frame of the SD tester 14 indicates a mismatch, the indicator 8 turns on the point light source 16 in the second row and the third column by a signal from the PC 2 or the function inspection device 6. A method of lighting the point light source 16 is arbitrary. For example, the point light source 16 may be changed from the turn-off state to the turn-on state or may blink.

Next, the configuration of the PC 2 will be described with reference to FIG. 4.

Figure 4:
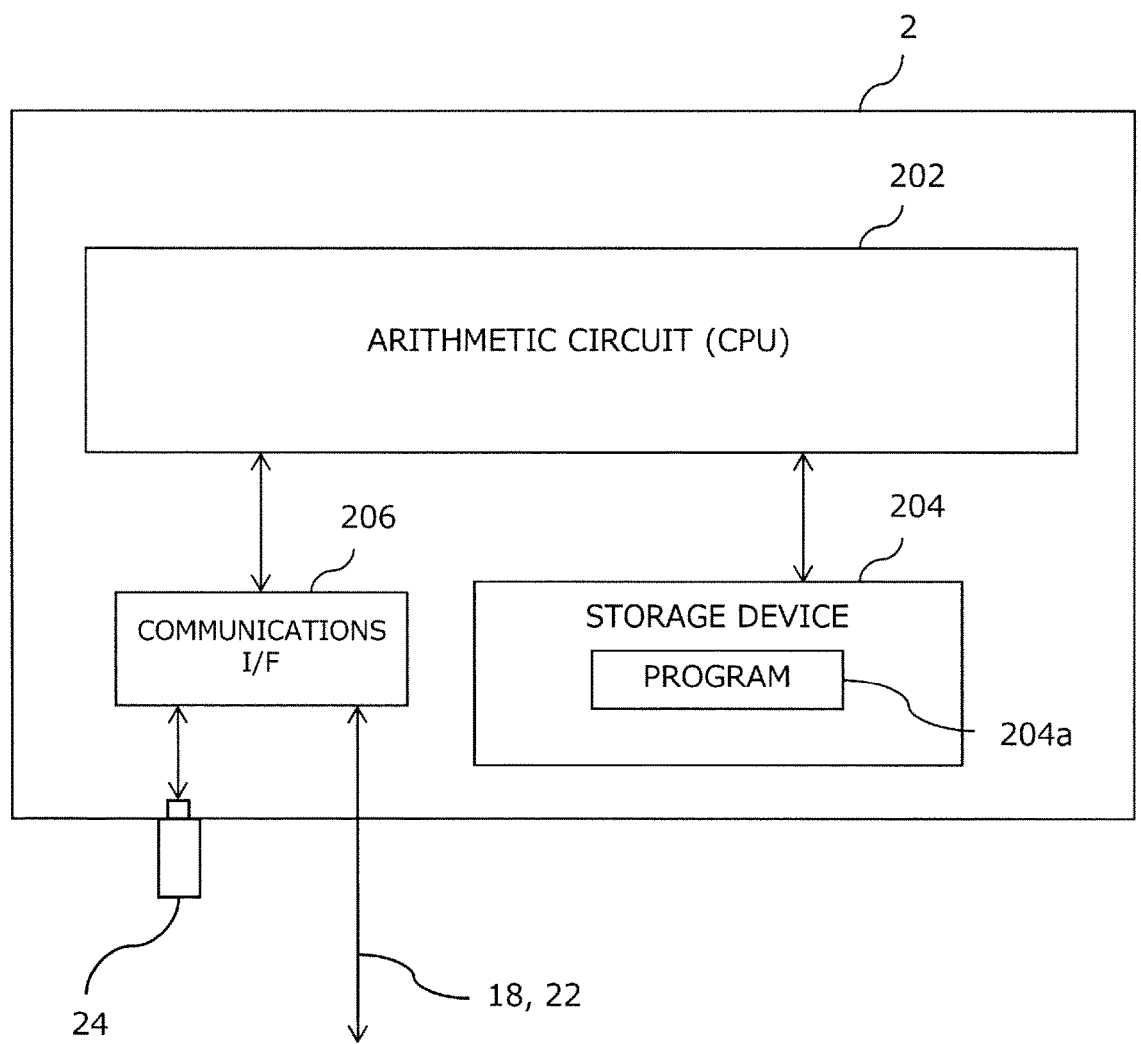
FIG. 4 is a diagram illustrating the configuration of a PC.

As illustrated in FIG. 4, the PC 2 includes an arithmetic circuit 202, a storage device 204, and a communications I/F 206. The arithmetic circuit 202 is a computer mounted on the PC 2 and is a semiconductor integrated circuit called a CPU. Hereinafter, the arithmetic circuit 202 will be referred to as the "CPU 202". The communications I/F 206 is a terminal for performing communication conforming to a communications standard such as USB (registered trademark) and/or Ethernet (registered trademark).

FIG. 4 illustrates the USB dongle 24 connected to a USB terminal which is the communications I/F 206 and the USB cables 18 and 22. The PC 2 may perform wireless communication conforming to, for example, the IEEE 802.11 standard. In that case, the communications I/F 206 may be a wireless communications circuit.

For convenience of description, it will be described below that the PC 2 or the CPU 202 exchanges information with an external device such as the function inspection device 6 and the indicator 8. However, the CPU 202 actually transmits information to the external device and instructs the communications I/F 206 or controls the communications I/F 206 to receive information from the external device.

The storage device 204 is a secondary storage device such as a random access memory (RAM), a read only memory (ROM), and/or a hard disk drive. The storage device 204 stores a computer program 204a. For example, the ROM which is the storage device 204 stores the computer program 204a. The computer program 204a is read by the CPU 202 and developed in the RAM that is also the storage device 204. Thus, the CPU 202 can execute the computer program 204a. The operation of the PC 2 described below is implemented by the computer program 204a installed and executed in the PC 2.

The storage device 204 also stores map information and security information to be described later. The map information is an example of content information and is stored and distributed in the SD memory card 100. The security information is information used to determine whether to permit the use of the map information and is generated by encrypting at least the CID of the specific SD memory card 100 by a predetermined encryption method. In the present embodiment, in addition to the CID, the security information includes the initial value of the vehicle specifying information and encrypted version information indicating the version of the map information. A specific description of the encryption process will be given later.

Note that the "vehicle specifying information" is information for specifying a vehicle in which the map information is used and for example, a chassis number, a vehicle identification number (VIN), the manufacturing number of a device mounted on the vehicle, or the like can be used. However, at the time of shipment of the SD memory card 100, in which vehicle each SD memory card 100 is used cannot be determined.

That is, the map vendor and the manufacturer cannot determine vehicle specifying information. Therefore, the initial value of predetermined vehicle specifying information is written in security information. The initial value is rewritten to the vehicle specifying information of a specific vehicle after the specific vehicle starts to be used in the future. The vehicle specifying information, the CID, and the version information are written in the SD memory card 100 as one encrypted file. The file may also be referred to as a "vehicle specifying file".

[Production Processing of Golden Sample in Map Vendor] Next, processing performed by a map vendor that is a sales supplier of map information will be described with reference to FIG. 5.

The map vendor sends map information indicating a map and security information used to determine whether to permit the use of the map to a manufacturer. The processing performed by the map vendor and the procedure of the processing are illustrated in FIG. 5.

First, the map vendor prepares a specific SD memory card whose CID is known. FIG. 5 illustrates the SD memory card as an SD memory card 100G in which a known CID-G 300 is recorded. Such SD memory card 100G can be, for example, the SD memory card 100 specifically provided by the manufacturer to the map vendor with information indicating the CID 300.

Figure 5:
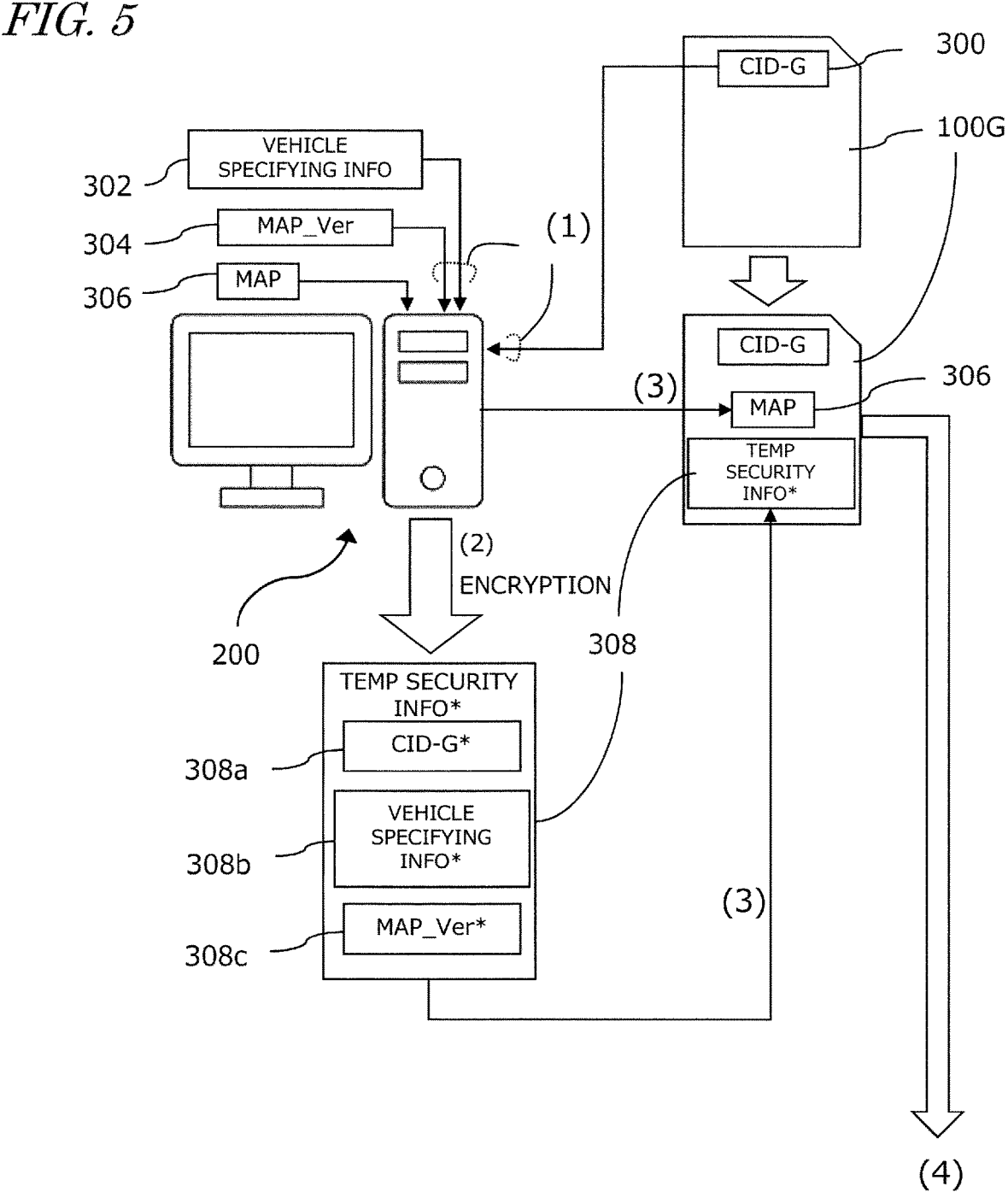
FIG. 5 is a diagram for explaining processing performed by a map vendor that is a sales supplier of map information.

Process (1) in FIG. 5 shows a state in which the CID-G 300 is input to the PC 200 of the map vendor. Process (1) also shows that vehicle specifying information 302, map version information 304, and map information 306 are input to the PC 200 of the map vendor. As described above, the vehicle specifying information 302 is a predetermined initial value. Note that the hardware configuration of the PC 200 of the map vendor is the same as that in FIG. 4 and hence is not illustrated.

In process (2) in FIG. 5, the PC 200 of the map vendor encrypts the CID-G 300, the vehicle specifying information 302, and the map version information 304 by a predetermined encryption method. As the encryption method, for example, a reversible encryption method using a prepared private key, a reversible encryption method using a public encryption key acquired in advance from a manufacturer, and an irreversible encryption method using a hash function can be adopted. The private key and hash function prepared in advance are shared in advance between the map vendor and the manufacturer. The private key may also be referred to as a common key. Note that it is not essential to encrypt the CID-G 300, the vehicle specifying information 302, and the map version information 304.

Figure 6:
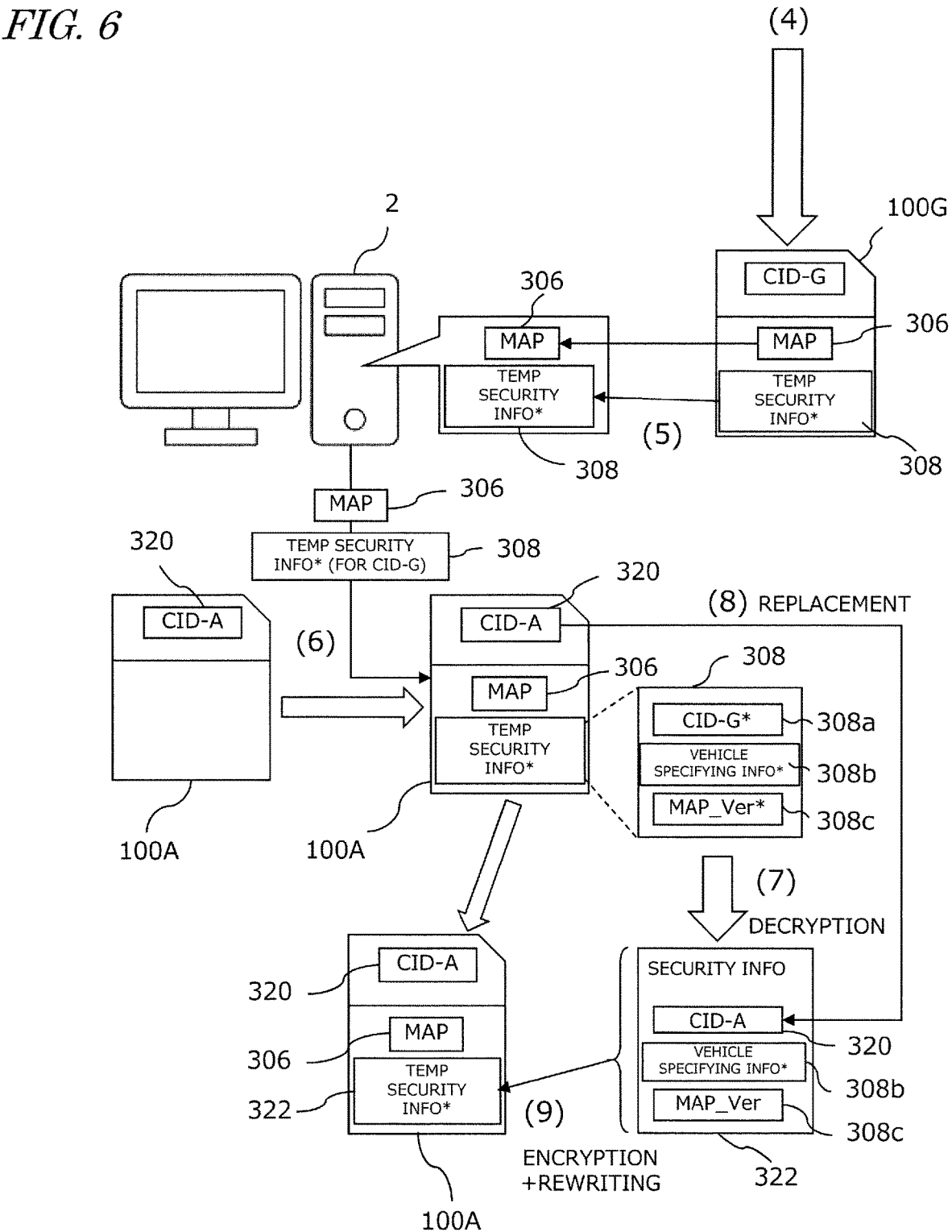
FIG. 6 is a diagram for explaining processing performed by a manufacturer who has received a golden sample from a map vendor.

Temporary security information 308 is generated by encryption processing. The temporary security information 308 includes encrypted CID-G 308a, vehicle specifying information 308b, and map version information 308c. In the drawings of FIGS. 5 and 6 and subsequent FIGS., "*" is added to the name of information to indicate that the information is encrypted.

Next, the PC 200 of the map vendor executes process (3). In process (3), the PC 200 of the map vendor duplicates the map information 306 and the generated temporary security information 308 to the user area 122 (FIG. 2) of the SD memory card 100G. As a result, in addition to the map information 306, the CID-G 300 for uniquely identifying itself and the temporary security information 308 are recorded in the SD memory card 100G. At this point, since the CID-G 300 and the CID-G 308a in the temporary security information 308 match, it can be said that the SD memory card 100G is a valid SD memory card. The SD memory card 100G obtained by process (3) is also referred to as a "golden sample". In addition, in the present specification, the memory card 100 G may be referred to as a "host recording medium".

The word "golden sample" as used in the manufacturing industry refers to a sample of a final product made by the manufacturer of the product. On the other hand, the "golden sample" as used in this specification is not strictly a sample of the final product. This is because the contents of the SD memory card 100G are not directly distributed to consumers as described later. In each SD memory card 100 sold to each consumer, the encrypted CID-G 308a in the security information 308 is rewritten and distributed using each CID.

In view of such circumstances, it is not essential that the CID-G 308a is included in the temporary security information 308 included in the golden sample, and any dummy data may be included. It is also not essential that it is encrypted. For example, any data having the same number of bits as the number of bits of the CID-G 300 of the SD memory card 100G may be used. This is because it is sufficient that the CID recorded in the non-user area and the encrypted CID in the security information correspond to each other on the SD memory card 100 at the time of distribution to the consumer.

Finally, in process (4), the map vendor sends the obtained SD memory card 100G to the manufacturer.

SD Memory Card Production Process by Manufacturer

Next, following process (4) by the map vendor, processes (5) to (10) on the manufacturer side that has received the golden sample from the map vendor will be described with reference to FIG. 6. The manufacturer copies the map information to many and unspecified SD memory cards 100 using the PC 2 illustrated in FIG. 3, records the security information obtained by encrypting the CID of each SD memory card 100, and produces an SD memory card as a final product.

In process (5), the PC 2 of the manufacturer reads the map information 306 and the temporary security information 308 from the SD memory card 100G obtained from the map vendor and stores the map information 306 and the temporary security information 308 in the storage device 204. That is, the PC 2 copies the map information 306 and the temporary security information 308 from the SD memory card 100G which is a host recording medium to the storage device 204 which is a recording medium different from an SD memory card 100A to be described later.

In process (6), the PC 2 copies the map information 306 and the temporary security information 308 stored in the PC 2 to the new SD memory card 100A prepared by the manufacturer. A CID-A 320 of the SD memory card 100A is recorded in the management area 121b of the SD memory card 100A. At this point, the encrypted CID-G 308a, the vehicle specifying information 308b, and the map version information 308c are present in the temporary security information 308.

Figure 3:
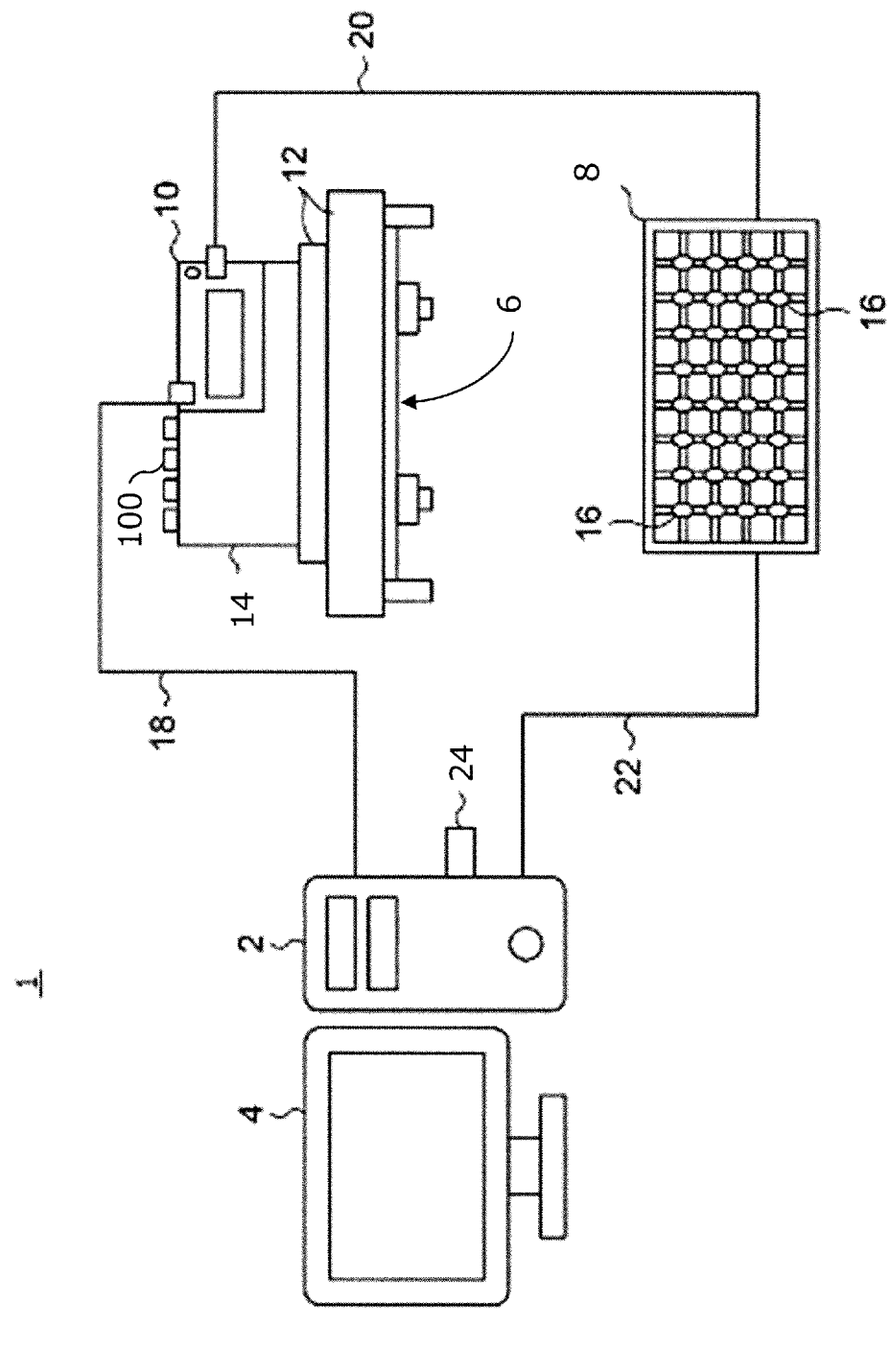
FIG. 3 is a diagram illustrating the configuration of a production system that produces a recording medium.

The SD memory card 100A is loaded in the SD tester 14 of the function inspection device 6 (FIG. 3). The operation of writing and/or reading information to and from the SD memory card 100A by the PC 2 is performed via the central board 10. In order to simplify the description, the description of being performed via the central board 10 will be omitted, and the PC 2 will be described as reading and writing information.

In process (7), the PC 2 decrypts the temporary security information 308 stored in the SD memory card 100A. As a result, the decrypted CID-G 308a, vehicle specifying information 308b, and map version information 308c are obtained.

Next, in process (8), the PC 2 reads the CID-A 320 from the SD memory card 100A. Specifically, the PC 2 transmits a command for reading the CID known to the PC 2 to the SD memory card 100A to acquire the CID-A 320. Then, the decrypted CID-G 308a obtained in process (7) is replaced with the read CID-A 320. As a result, security information 322 including CID-A 320, the vehicle specifying information 308b, and the map version information 308c is obtained.

Figure 7:
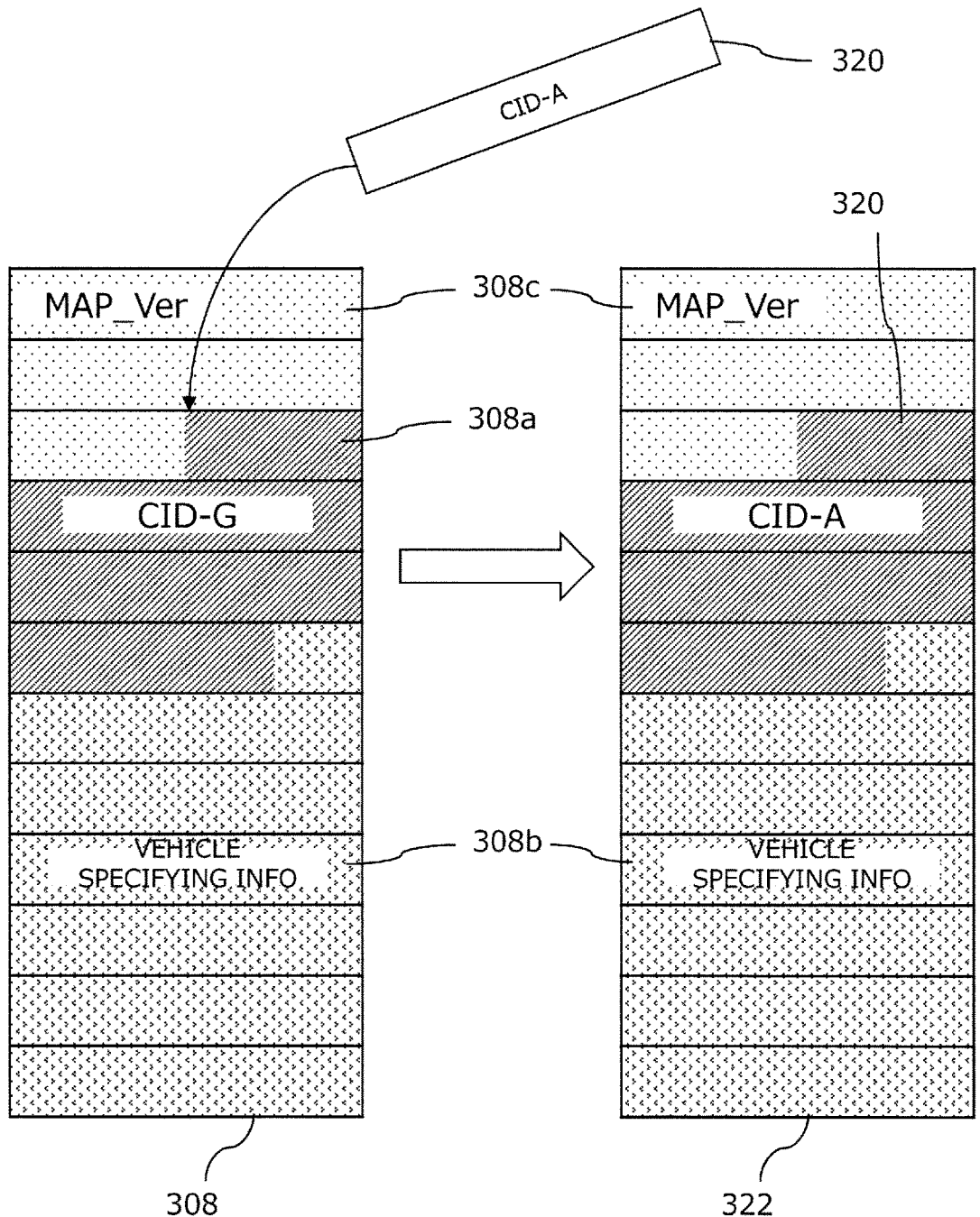
FIG. 7 is a diagram for explaining a process of generating security information for each SD memory card from security information of a golden sample.

The processing of generating the security information 322 from the security information 308 will be described more specifically with reference to FIG. 7.

In the case of the SD memory card 100G and the SD memory card 100A manufactured by the same manufacturer, it can be assumed that the CID-G 300 and the CID-A 320 are expressed by numerical strings of the same number of bits. Therefore, when the head bit of the read CID-A 320 is arranged at the head bit position of the CID-G 308a in the decrypted security information 308, and the CID-G 308a is subsequently replaced with the CID-A 320, the CID-G 308a can be replaced with the CID-A 320 without shifting from the original CID-G 308a by 1 bit. When the CID-G 308a of the temporary security information 308 is rewritten to the CID-A 320, the security information 322 unique to the SD memory card 100A is obtained.

Note that, in the above description, an example has been described in which the security information 308 is decrypted, but the security information can be rewritten even in an encrypted state. For example, in the encrypted temporary security information 308, the CID-G 300, the vehicle specifying information 308b, and the map version information 308c are separably present, and the head bit position and the data length of each are fixed. The CID-A 320 is read and encrypted in advance. The PC 2 may write the encrypted CID-A 320 from the head bit position of the CID-G 308a. However, at this time, the data lengths of the encrypted CID-G 300 and CID-A 320 also need to match. Also with such process, it is possible to rewrite the encrypted CID-G 308a to the encrypted CID-A 322a without shifting from the encrypted CID-G 308a even by 1 bit. When the encrypted CID-G 308a of the security information 308 is rewritten to the encrypted CID-A 322a, the security information 322 is obtained.

Refer again to FIG. 6.

In process (9), the PC 2 encrypts the security information 322 by the encryption method designated by the map vendor. For example, the map vendor provides the manufacturer with the USB dongle 24 storing software or a library for performing encryption by a predetermined encryption method. When the PC 2 inputs the security information 322 to the software or library, the encrypted security information 322 is output as a result of the processing. The PC 2 rewrites the temporary security information 308 already existing in the SD memory card 100A to the encrypted security information 322. The map information 306 is maintained as it is, and the CID-A 320 recorded in the non-rewritable non-user area 121 is also maintained as it is. The map information 306 is maintained as it is, and the CID-A 320 recorded in the non-rewritable non-user area 121 is also maintained as it is. As a result, the CID-A 320, the map information 306, and the encrypted security information 322 are recorded in the SD memory card 100A.

By the operation of the PC 2 described above, the security information 322 of the SD memory card 100A newly prepared on the manufacturer side includes the CID-A 320 of the SD memory card 100A. As a result, it is possible to implement a mechanism for permitting the use of the map information 306 only when the CID of the SD memory card is encrypted and included in the security information. Even if the map information 306 is duplicated or the like, the unauthorized use of the map information 306 can be avoided.

Note that processes (7) to (9) of creating the security information 322 described above each are an example, and various modifications can be considered. For example, the PC 2 extracts the vehicle specifying information 308b and the map version information 308c from the security information 308 obtained by process (7). The PC 2 creates the security information 322 by arranging the CID-A 320, the vehicle specifying information 308b, and the map version information 308c on the memory, for example, in the order illustrated in FIG. 6. Then, the PC 2 may encrypt the security information 322 and rewrite the security information 308 in the SD memory card 100A to the encrypted security information 322.

In conclusion, according to the above-described process and the modification thereof, it can be said that the encrypted temporary security information 308 in the SD memory card 100A obtained by process (6) is rewritten to the encrypted security information 322. Even if a method other than the above-described processing is adopted, it is within the scope of the present invention in a case where the encrypted temporary security information 308 is rewritten to the encrypted security information 322.

Figure 8:
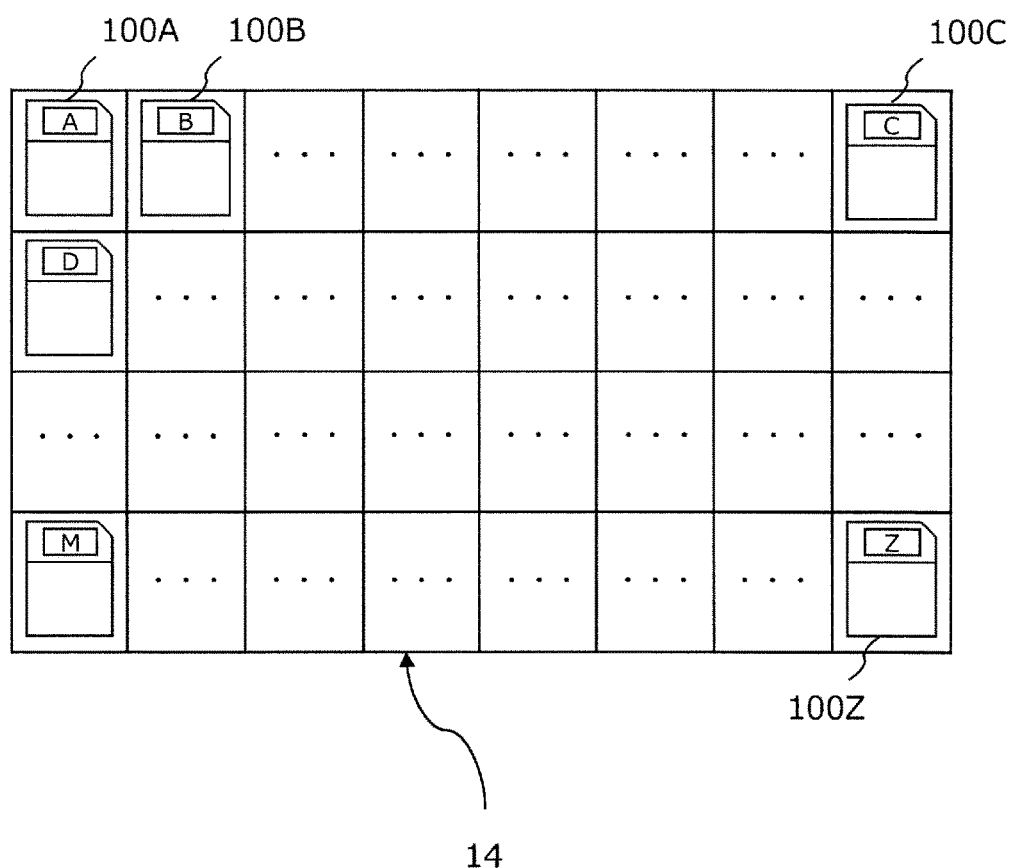
FIG. 8 is a diagram illustrating an arrangement example of a plurality of SD memory cards loaded in an SD tester.
Figure 9:
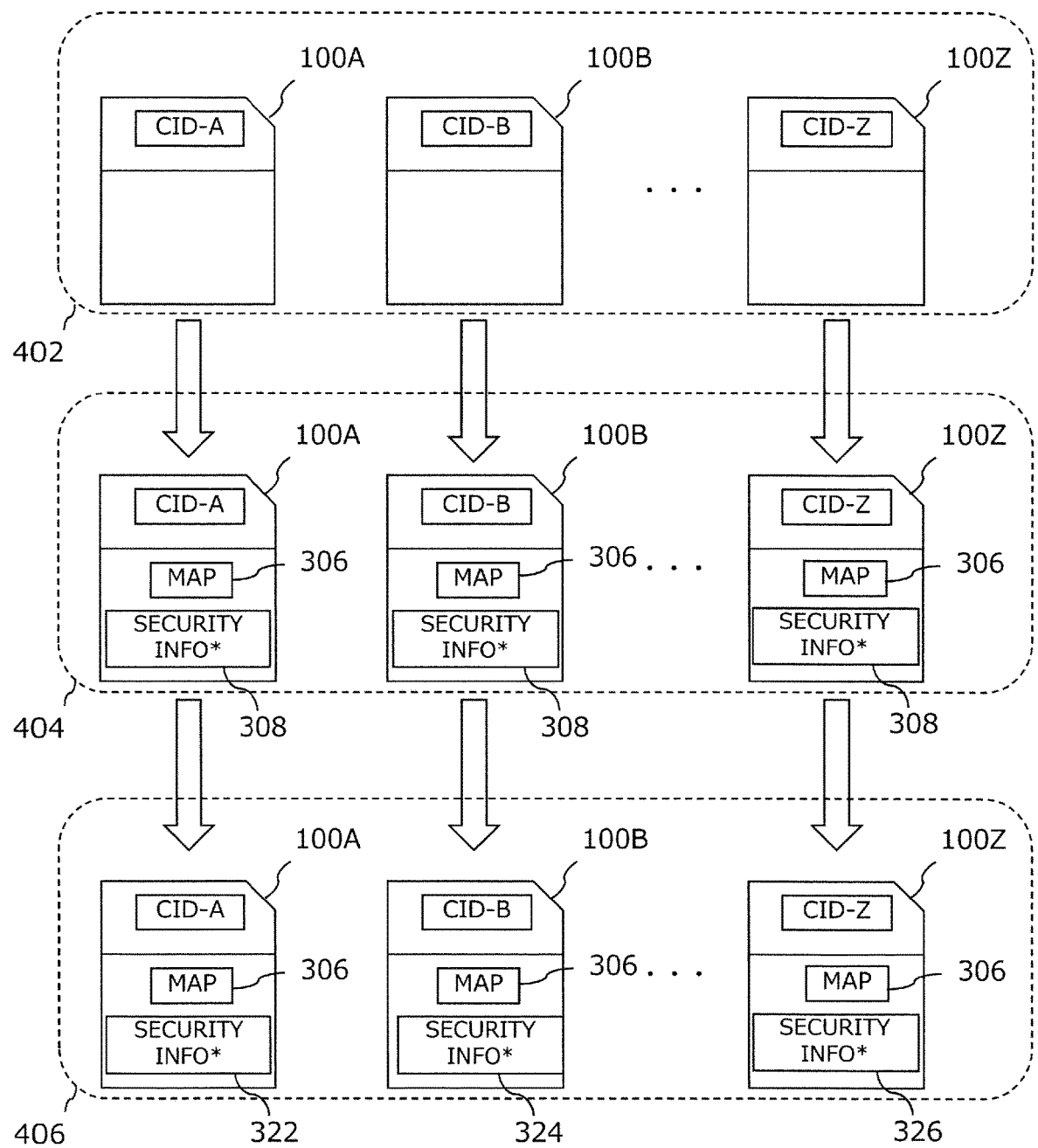
FIG. 9 is a diagram illustrating the transition of information recorded in each SD memory card.

The above processing has been described using only one SD memory card for convenience. The function inspection device 6 can be loaded with a plurality of SD memory cards 100, and information can be written and read independently and in parallel to each of the SD memory cards. For example, FIG. 8 illustrates an arrangement example of a plurality of SD memory cards 100A to 100Z loaded in the SD tester 14. Further, the transition of information recorded in each of the SD memory cards 100A to 100Z is illustrated in FIG. 9.

The SD memory cards 100A to 100Z are in a state in which there is no information in each user area 122, that is, in a blank state 402. Through the above processing, the common map information 306 and the temporary security information 308 are recorded in the user areas 122 of the SD memory cards 100A to 100Z. As a result, the SD memory cards 100A to 100Z transition to a state 404 in which the golden sample is simply duplicated. Thereafter, the temporary security information 308 of each of the SD memory cards 100A to 100Z is rewritten to a corresponding one of pieces of security information 322, 324, *, and 326 respectively corresponding to the CIDs of the SD memory cards 100A to 100Z. As a result, the state transitions to a state 406 in which each of the pieces of security information 322, 324, *, and 326 of the SD memory cards 100A to 100Z is recorded.

In this manner, all the SD memory cards loaded in the SD tester 14 each can be rewritten to the security information corresponding to each CID.

Next, the processing of the PC 2 described above will be described with reference to FIG. 10. Hereinafter, the CID will be described as "medium specifying information", and an SD memory card will be simply described as a "card".

In step S10, the CPU 202 of the PC 2 receives a signal indicating that the preparation of all the cards is completed from the function inspection device 6. In next step S11, the CPU 202 transmits the content information of the golden sample and the temporary security information to the function inspection device 6.

In step S12, the CPU 202 transmits a command to the function inspection device 6 to write the content information of the golden sample and the temporary security information in the user area of each card. More specific processing in this step will be described later.

In step S13, the CPU 202 transmits a command for requesting the function inspection device 6 to read the temporary security information and the medium specifying information. As a result, the CPU 202 causes the function inspection device 6 to read the temporary security information from the user area of each card, read the medium specifying information from the non-user area, and transmit each piece of temporary security information and the medium specifying information to the PC 2. In step S14, the CPU 202 receives the temporary security information and the medium specifying information from the function inspection device 6.

In step S15, the CPU 202 decrypts the received temporary security information, generates security information by replacing the medium specifying information of the golden sample in the temporary security information with each piece of medium specifying information, and encrypts the security information. As described above, the encryption uses software or a library for encryption provided by a map vendor.

In step S16, the CPU 202 transmits the command and the encrypted security information to the function inspection device 6 and rewrites the temporary security information recorded in each card with the encrypted security information.

Through the above processing, the PC 2 can record the map information 306 and the each of the pieces of security information 322, 324, and 326 rewritten according to the medium specifying information of each SD memory card 100 in each SD memory card 100 loaded in the function inspection device 6. Note that although it is preferable that step S10 described above is actually performed, it is not essential and can be omitted.

Next, details of the processing in steps S12 and S16 will be described. Both steps are processes for verifying that writing to the card has been appropriately performed.

First, details of step S12 will be described with reference to FIG. 11.

In step S121, the CPU 202 of the PC 2 transmits, to the function inspection device 6, a command to write to the user area 122 of each card, the map information 306 to be written, and the security information 308 of the golden sample.

In step S122, the CPU 202 receives a notification of completion of writing from the function inspection device 6.

Subsequent step S123 and subsequent steps are the processing of verifying whether information to be written has been correctly written. In step S123, the CPU 202 transmits, to the function inspection device 6, a command to read the map information and the security information written in the user area 122 of each card. The read command includes a command to transmit the read information to the CPU 202.

In step S124, the CPU 202 receives the map information and the security information read from the user area 122 of each card from the function inspection device 6.

In step S125, the CPU 202 verifies whether or not the map information 306 transmitted to the function inspection device 6 matches the map information received from the function inspection device 6 for all the cards. Similarly, the CPU 202 verifies whether the security information 308 transmitted to the function inspection device 6 and the security information received from the function inspection device 6 match or mismatch for all the cards.

In step S126, the CPU 202 determines whether the verification results of all the cards indicate matches. If YES in step S126, the CPU 202 ends the processing in step S12 and proceeds to the processing in step S13 in FIG. 10. In contrast to this, if even one verification result indicates a mismatch, the process proceeds to step S127.

In step S127, the CPU 202 acquires a notification of the position of the card indicating the mismatch from the function inspection device 6. The CPU 202 turns on the point light source 16 at the position corresponding to the position of the card indicating the notified mismatch in the indicator 8 to notify the user of the error.

In step S128, the CPU 202 determines whether or not the error notification is the first time. In a case where the error notification is performed for the first time, that is, in a case where the error is notified for the first time, the process is retried from step S121. At this time, the manufacturer checks, for example, whether there is a contact failure between each terminal of the SD tester 14 and each pin of the card. Empirically, it has been found that a write error associated with a contact failure often occurs. Therefore, when the process is started again from step S121 after the contact failure is confirmed, the verification result indicates a match in many cases.

In contrast to this, in a case where the error notification has been performed before and this is the second time the notification has been performed, the CPU 202 determines that an error is present in the card and stops the process.

Figure 10:
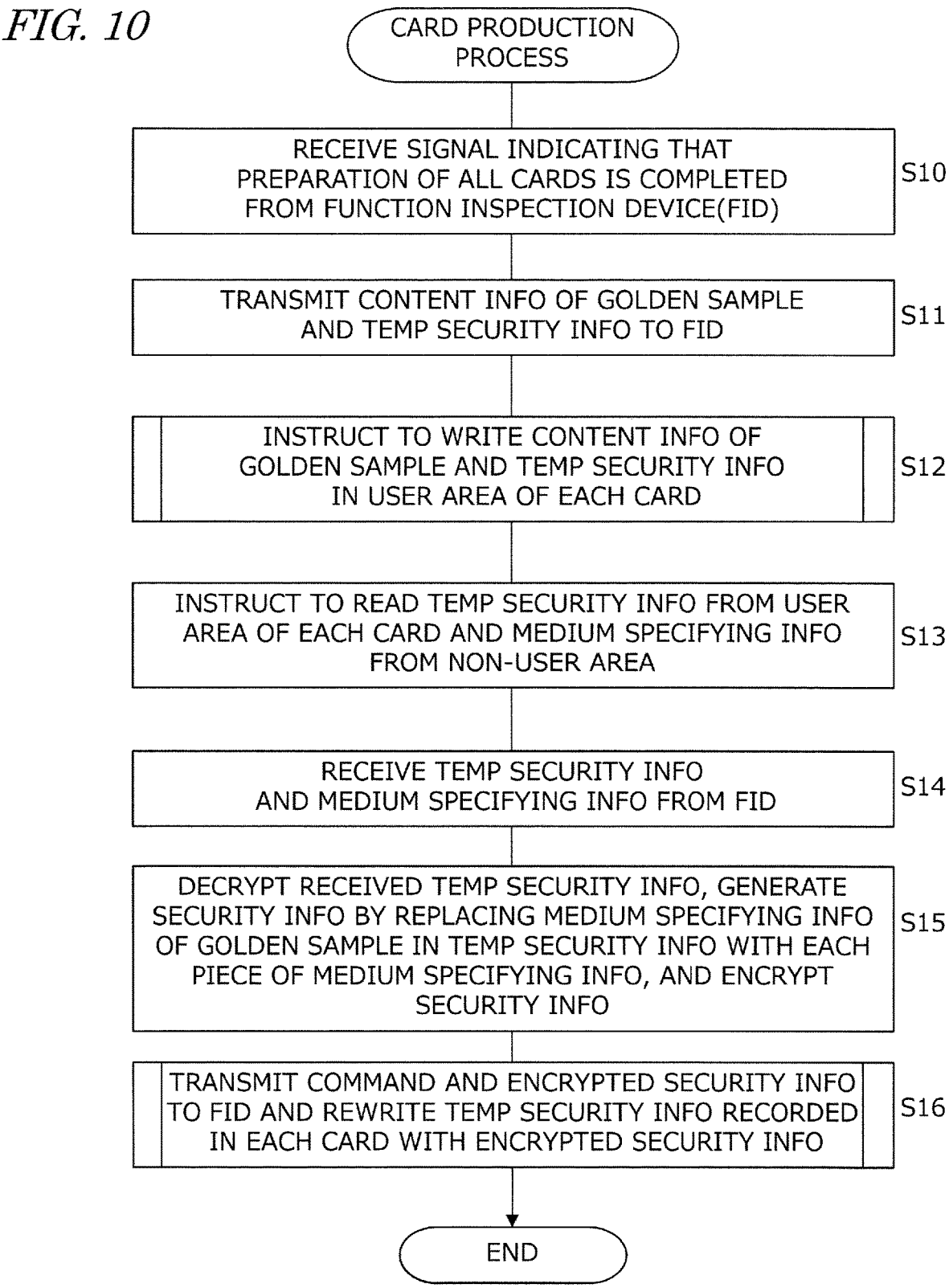
FIG. 10 is a flowchart illustrating a procedure of processing performed by a PC.
Figure 12:
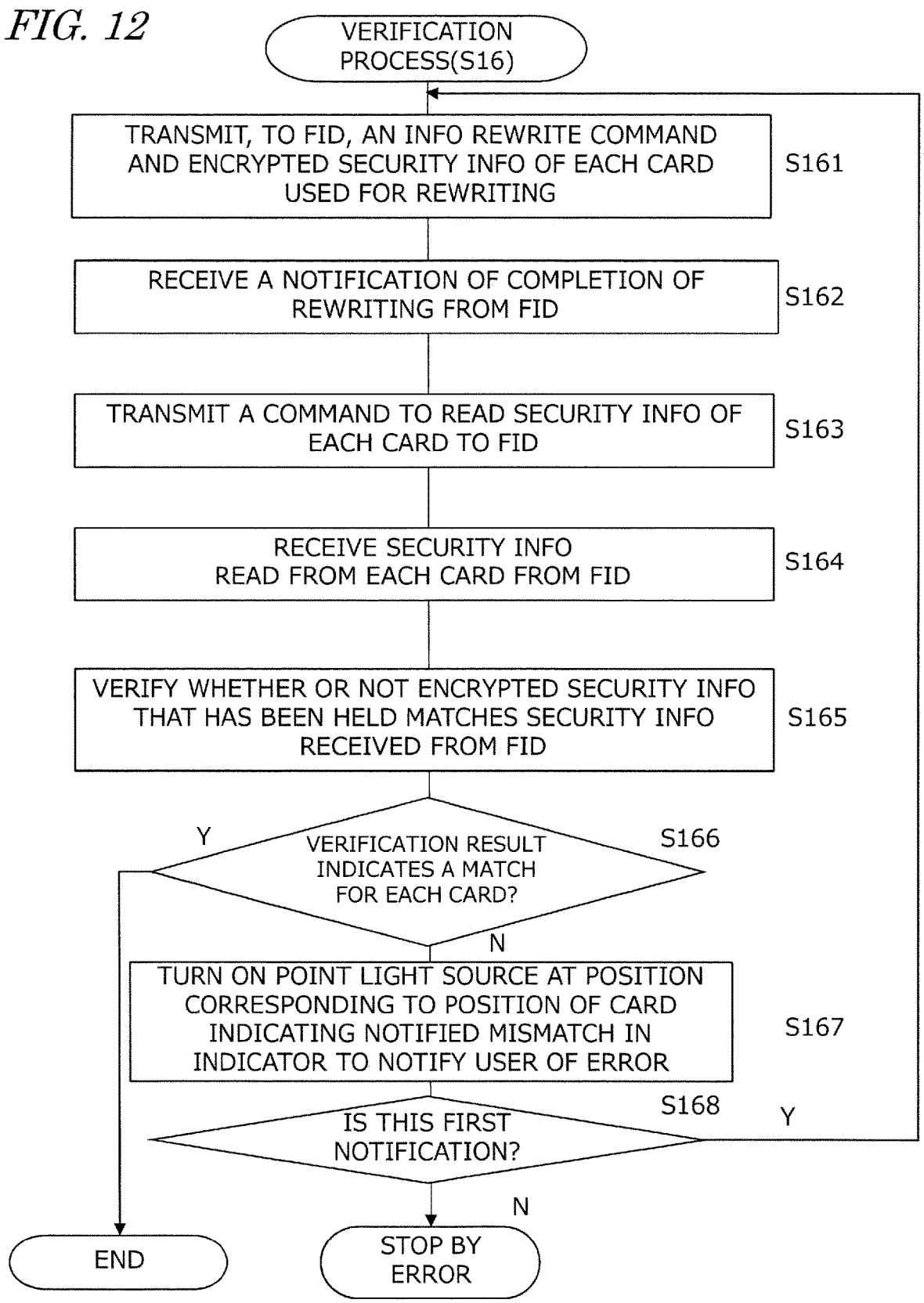
FIG. 12 is a flowchart illustrating a detailed processing procedure in step S16 in FIG. 10.

Next, the details of step S16 in FIG. 10 will be described with reference to FIG. 12.

In step S161, the CPU 202 of the PC 2 transmits, to the function inspection device 6, an information rewrite command and encrypted security information of each card used for rewriting. In response to the rewrite command, the function inspection device 6 rewrites the temporary security information 308 to the encrypted security information 322 for each card. In step S162, the CPU 202 receives a notification of completion of rewriting from the function inspection device 6.

In step S163, the CPU 202 transmits a command to read the security information of each card to the function inspection device 6. In response to the read command, the function inspection device 6 reads the security information of each card. In step S164, the CPU 202 receives the security information read from each card from the function inspection device 6.

In step S165, after transmitting information of all the cards to the function inspection device 6, the CPU 202 verifies whether or not the encrypted security information that has been held matches the security information received from the function inspection device 6.

Figure 11:
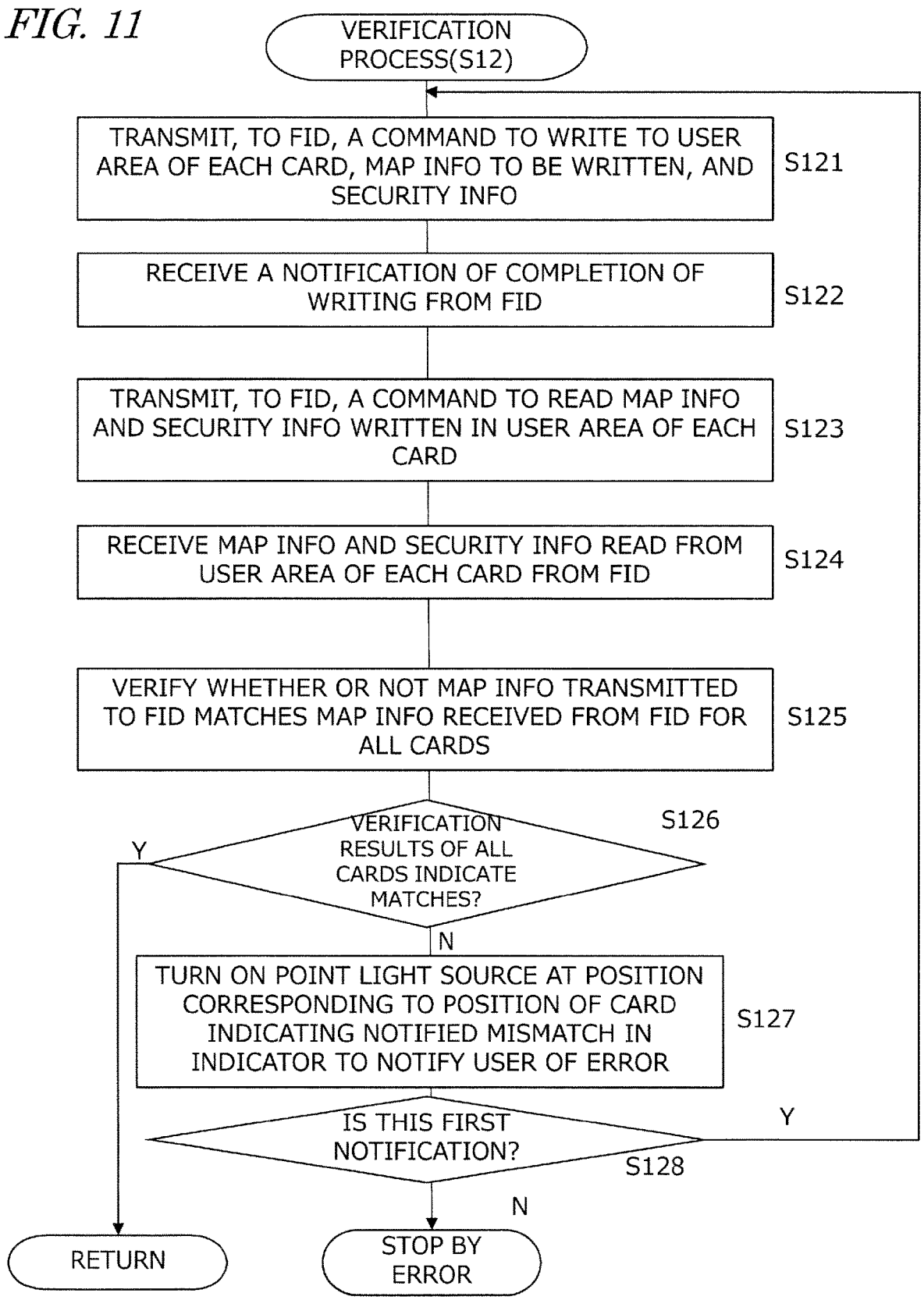
FIG. 11 is a flowchart illustrating a detailed processing procedure in step S12 in FIG. 10.

The processing in steps S166, S167, and S168 is the same as the processing in steps S126, S127, and S128 in FIG. 11, respectively.

In step S166, the CPU 202 determines whether or not the verification result indicates a match. If the verification result indicates a match, the CPU 202 ends the processing in step S16. That is, the process in FIG. 10 is also ended. In contrast to this, in a case where even one verification result indicates a mismatch, the process proceeds to step S167.

In step S167, the CPU 202 acquires a notification of the position of the card indicating the mismatch from the function inspection device 6. The CPU 202 turns on the point light source 16 at the position corresponding to the position of the card indicating the notified mismatch in the indicator 8 to notify the user of the error.

In step S168, the CPU 202 determines whether or not the error notification is the first time. In a case where the error notification is performed for the first time, that is, in a case where the error notification is performed for the first time, the process is retried from step S161. At this time, the manufacturer checks, for example, whether there is a contact failure between each terminal of the SD tester 14 and each pin of the card.

In contrast to this, in a case where the error notification has been performed before and this is the second time the notification has been performed, the CPU 202 determines that an error is present in the card and stops the process.

The map information and the security information are recorded in the user area 122 of the SD memory card 100 produced by the above processing. The security information includes the version information, the CID of each SD memory card 100, and the vehicle specifying information in an encrypted manner. When the map information is copied to another SD memory card together with the security information or without the security information, the car navigation apparatus does not permit the use of the map information. This is because there is no security information including the CID of the SD memory card as the copy destination. Accordingly, even if the map information is distributed using SD memory cards, only the user who has properly purchased the map information from the map vendor can use the map information in the car navigation apparatus.

In the above-described example of the SD memory card 100, it has been described that the CID of the SD memory card 100 is recorded in the management area 121b in the non-user area 121. Since the user cannot rewrite the data of the non-user area 121, when the CID is recorded in the management area 121b, falsification of the CID can be prevented, and security can be further maintained. However, a memory card may be configured such that such that the CID is stored in the memory card provided with only the user area in which the non-user area 121 does not exist and the user can rewrite the security information based on the CID.

In the above description, the temporary security information recorded in SD memory card 100 is overwritten with the encrypted security information. However, the rewriting process by overwriting is not essential. For example, the temporary security information 308 is moved from SD memory card 100A to a memory or another recording medium of PC 2, and the temporary security information 308 is temporarily erased from the SD memory card 100. Thereafter, the security information 322 generated by the PC 2 may be written in the recording area of the SD memory card 100A. Alternatively, the security information 322 generated by the PC 2 may be additionally written while the temporary security information 308 is left on the SD memory card 100A. In short, the security information 322 may be finally recorded on the SD memory card 100A.

The embodiments of the present invention have been described above. The present invention is not limited to the above-described embodiments, and other embodiments in which changes, replacements, additions, omissions, and the like are appropriately made are also within the scope of the present invention. For example, whether to permit the use of the map information recorded in an SD memory card is determined using the CID of the SD memory card in the security information. Therefore, the security information only needs to include at least the CID of an SD memory card and does not necessarily include the version information of a map and/or vehicle specifying information.

In addition, the accompanying drawings and the detailed description have been provided to describe the embodiments of the present invention. It should be noted that the accompanying drawings and the detailed description include contents that are not essential for solving the problem, and all of them are not essential for solving the problem.

What is claimed is:

1. A method for producing a recording medium having a recording area in which content information indicating a content and security information for security for the content information are recorded,
   in the recording area, medium specifying information for uniquely identifying the recording medium itself being recorded in advance, the medium specifying information having a predetermined number of bits,
   the method comprising steps of:
   (a) writing temporary security information and the content information in the recording area, the temporary security information including given information different from the medium specifying information, the given information having the same number of bits as the medium specifying information, and being to be replaced with the medium specifying information;
   (b) reading the medium specifying information and the temporary security information from the recording area;
   (c) replacing the given information in the temporary security information with the medium specifying information;
   (d) encrypting the temporary security information in which the given information is replaced with the medium specifying information to generate the security information; and
   (e) causing the security information generated in the step (d) to be recorded in the recording area.

2. The method according to claim 1, further comprising a step (f) copying the temporary security information and the content information from a host recording medium in which original copies of the temporary security information and the content information are recorded to a recording medium different from the recording medium,
   wherein the step (a) is performed after the step (f).

3. The method according to claim 2, further comprising a step (g) verifying whether the temporary security information written in the step (a) matches an original copy of the temporary security information and verifying whether the content information written in the step (a) matches the original copy.

4. The method according to claim 3, wherein an error is notified when at least one of the verification results in the step (g) indicates a mismatch.

5. The method according to claim 4, wherein when the error is notified, the step (g) is retried.

6. The method according to claim 3, wherein when both verification results in the step (g) indicate matches, the steps (b) to (e) are performed.

7. The method according to claim 1, further comprising a step (h) reading the security information from the recording area of the recording medium and verifying whether or not the medium specifying information in the read security information matches the medium specifying information encrypted in the step (d),
wherein the step (h) is performed after the step (e).

8. The method according to claim 7, wherein when the verification result in the step (h) indicates a mismatch, an error is notified.

9. The method according to claim 8, wherein when the error is notified, the step (h) is retried.

10. The method according to claim 1, wherein the content information is map information indicating a map as the content.

11. The method according to claim 10, wherein the temporary security information written in the step (a) further includes vehicle specifying information for specifying a vehicle in which the map information is used and version information indicating a version of the map information, and
in the step (d), the vehicle specifying information and the version information are encrypted.

12. The method according to claim 11, wherein the temporary security information is encrypted in advance,
the method further comprises a step (i) decrypting the encrypted temporary security information,
the step (i) is performed after the step (b), and the step (c) is performed after the step (i).

13. The method according to claim 1, wherein the recording medium is an SD memory card,
the recording area includes a user area in which a user can rewrite data and a non-user area in which the user cannot rewrite data,
the medium specifying information is recorded in advance in the non-user area,
in the step (a), the temporary security information and the content information are written in the user area, and
the step (b) includes transmitting a read command for reading the medium specifying information from the non-user area to the recording medium, reading the medium specifying information by acquiring the medium specifying information transmitted from the recording medium in response to the read command, and reading the temporary security information from the user area.

14. The method according to claim 1, further comprising a step (j) receiving a notification indicating that preparation of the recording medium to be recorded is completed, wherein the step (a) is performed after the notification is received.

15. The method according to claim 14, wherein the notification received in the step (j) is a signal indicating that preparation of a plurality of the recording media is completed.

16. The method according to claim 4, wherein a plurality of the recording media is present, and
the notification of the error includes information specifying the recording medium, among the plurality of recording media, in which the verification result indicates a mismatch.

17. An apparatus comprising:
a communications interface configured to communicate with an external device;
a storage device; and
an arithmetic circuit, and
the apparatus executing the method defined in claim 15 using the arithmetic circuit,
wherein the storage device stores the content information and the temporary security information including the given information, and
in response to reception of the signal, the arithmetic circuit reads the content information and the temporary security information from the storage device, transmits the content information and the temporary security information to a function inspection device via the communications interface,
causes the function inspection device to execute the steps (a) and (b),
receives the medium specifying information and the temporary security information from the function inspection device via the communications interface,
executes the step (d),
transmits the security information generated by executing the step (d) to the function inspection device via the communications interface, and
causes the function inspection device to execute the step (e).

18. A non-transitory computer-readable medium storing a computer program for causing the arithmetic circuit of the apparatus defined in claim 17 to execute:
reading the content information and the temporary security information from the storage device;
causing the function inspection device to transmit the content information and the temporary security information via the communications interface;
causing the function inspection device to transmit a command for executing the steps (a) and (b);
receiving the medium specifying information and the temporary security information from the function inspection device via the communications interface;
executing the step (d);
causing the function inspection device to transmit the security information generated by executing the step (d) via the communications interface; and
causing the function inspection device to transmit a command for executing the step (e).

* * * * *